US012553417B2

(12) United States Patent
Bach-Sørensen et al.

(10) Patent No.: US 12,553,417 B2
(45) Date of Patent: Feb. 17, 2026

(54) ROTOR DRIVE SYSTEM ASSISTED DISENGAGEMENT OF THE ROTOR-LOCK MECHANISM (71) Applicant: Vestas Wind Systems A/S, Aarhus N. (DK)

(72) Inventors: Esben Bach-Sørensen, Hobro (DK); Lars Rohrmann Andersen, Hadsten (DK); Niels Møller Madsen, Aarhus C (DK); Stanislaw Zelazny, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/850,615

(22) PCT Filed: Mar. 27, 2023

(86) PCT No.: PCT/DK2023/050055
§ 371 (c)(1),
(2) Date: Sep. 25, 2024

(87) PCT Pub. No.: WO2023/186231
PCT Pub. Date: Oct. 5, 2023

(65) Prior Publication Data
US 2025/0207561 A1 Jun. 26, 2025

(30) Foreign Application Priority Data
Mar. 30, 2022 (DK) .......................... PA 2022 70147

(51) Int. Cl.
*F03D 80/50* (2016.01)
*F03D 15/00* (2016.01)
(Continued)

(52) U.S. Cl.
CPC ........... *F03D 80/505* (2023.08); *F03D 15/00* (2016.05); *F03D 17/009* (2023.08); *F03D 13/10* (2016.05);
(Continued)

(58) Field of Classification Search
CPC ........ F03D 80/505; F03D 13/10; F03D 80/50; F03D 13/30; F03D 80/011; F03D 80/001;
(Continued)

(56) References Cited

U.S. PATENT DOCUMENTS 10,240,582 B2 * 3/2019 Plano Morillo ........ F03D 80/82
2010/0232978 A1 * 9/2010 Nielsen ................... F03D 80/50
416/248

(Continued)

FOREIGN PATENT DOCUMENTS

| EP | 1291521 A1 | 3/2003 |
| EP | 3540215 A1 | 9/2019 |
| WO | 20210190719 A1 | 9/2021 |

OTHER PUBLICATIONS

Danish Patent and Trademark Office, technical examination issued in corresponding DK Application No. PA 2022 70147, dated Oct. 25, 2022.

(Continued)

*Primary Examiner* — Nathaniel E Wiehe
*Assistant Examiner* — Art Golik
(74) *Attorney, Agent, or Firm* — Wood Herron & Evans LLP (57) ABSTRACT A method of disengaging a rotor-lock of a wind turbine, the rotor comprising one or more blades, which due to the gravitational pull, generates a rotor torque which is opposed by a rotor-lock counter-torque from the rotor-lock, the method comprising: a) determining a direction of the rotor torque with a sensor system; b) applying a rotor-drive (Continued)

counter-torque to the rotor with a rotor-drive system, wherein the rotor-drive counter-torque acts to oppose the determined rotor torque and causes the rotor-lock counter-torque to reduce; c) during or after the application of the rotor-drive counter-torque, disengaging the rotor-lock mechanism; wherein the step of determining a direction of the rotor torque comprises applying a torque restriction to the rotor-drive based on the determined direction of the rotor torque, the torque restriction preventing the application of torque to the rotor by the rotor-drive system in the same direction as the rotor torque.

15 Claims, 6 Drawing Sheets

(51) Int. Cl.
  *F03D 17/00* (2016.01)
  *F03D 13/10* (2016.01)
  *F03D 13/30* (2016.01)
  *F03D 80/00* (2016.01)

(52) U.S. Cl.
  CPC ............ *F03D 13/30* (2016.05); *F03D 80/001* (2023.08); *F03D 80/011* (2023.08); *F03D 80/50* (2016.05); *F05B 2230/60* (2013.01); *F05B 2230/70* (2013.01); *F05B 2230/80* (2013.01); *F05B 2260/31* (2020.08); *F05B 2270/331* (2013.01); *F05B 2270/335* (2013.01)

(58) Field of Classification Search
  CPC .............. F05B 2230/70; F05B 2260/31; F05B 2270/331; F05B 2230/60; F05B 2230/80; F05B 2270/335
  See application file for complete search history.

(56) References Cited

U.S. PATENT DOCUMENTS

| | | | |
|---|---|---|---|
| 2012/0009064 A1* | 1/2012 | Baek ..................... | F03D 1/0641 416/23 |
| 2014/0010651 A1* | 1/2014 | Nies ........................ | F03D 80/00 416/244 R |
| 2015/0118056 A1* | 4/2015 | Rose, Jr. ................. | F03D 80/50 29/889 |
| 2015/0308467 A1* | 10/2015 | Brokes .................... | F03D 13/10 60/435 |
| 2020/0318496 A1* | 10/2020 | Manikas ................. | F03D 13/35 |
| 2024/0328394 A1* | 10/2024 | Gomez Mora ....... | F03D 7/0248 |

OTHER PUBLICATIONS

International Searching Authority, International Search Report and Written Opinion issued in corresponding PCT Application No. PCT/DK2023/050055, dated Mar. 27, 2023.

* cited by examiner

ROTOR DRIVE SYSTEM ASSISTED DISENGAGEMENT OF THE ROTOR-LOCK MECHANISM

FIELD OF THE INVENTION

The present invention relates to a method of controlling a wind turbine, a method of constructing or dismantling a wind turbine rotor, and to a wind turbine.

BACKGROUND OF THE INVENTION

During wind turbine construction, deconstruction and/or maintenance, it may be necessary to lock the wind turbine rotor in position using a rotor lock. There is an issue that, due to minor movements of the rotor while it is functionally locked in position, the rotor lock may have a frictional interference with the rotor, which may prevent unlocking of the rotor lock. In order to reduce the frictional interference, a user may apply a torque to the rotor using a rotor drive. However, it has been found that a user may apply a torque in an incorrect direction, increasing the frictional interference between the rotor and rotor lock and potentially damaging bearings of the wind turbine.

SUMMARY OF THE INVENTION

A first aspect of the invention provides a method of disengaging a rotor-lock of a wind turbine, the rotor comprising one or more blades, which due to the gravitational pull, generate a rotor torque which is opposed by a rotor-lock counter-torque from the rotor-lock, the method comprising:
  a) determining a direction of the rotor torque with a sensor system;
  b) applying a rotor-drive counter-torque to the rotor with a rotor-drive system, wherein the rotor-drive counter-torque acts to oppose the determined rotor torque and causes the rotor-lock counter-torque to reduce;
  c) during or after the application of the rotor-drive counter-torque, disengaging the rotor-lock mechanism;
wherein the step of determining a direction of the rotor torque comprises applying a torque restriction to the rotor-drive based on the determined direction of the rotor torque, the torque restriction preventing the application of torque to the rotor by the rotor-drive system in the same direction as the rotor torque.

With such an arrangement, a user may be prevented from applying a torque to a wind turbine rotor using a rotor drive in a direction that may cause damage to the wind turbine, in particular to the rotor lock or to the bearings of the wind turbine.

The rotor-drive system may be a turner gear, a generator used in motor mode, or may be any other means for exerting a mechanical torque on the rotor.

The method may further comprise detecting that the rotor-lock mechanism has disengaged and terminating the torque restriction after disengaging the rotor-lock mechanism.

Step b) may be performed based on an input of a user, the input of the user being restricted based on the torque restriction.

The method may further comprise displaying the torque restriction visually to a user.

Step b) may be performed automatically following the performance of step a).

The sensor system may comprise one or more sensors arranged in the blades.

The wind turbine may comprise a control system, and the method may further comprise attempting to establish communication between the control system and the sensors, and determining a blade attachment condition based on the success of communication with the sensors, the torque restriction being based on the blade attachment condition.

The method may further comprise determining a blade attachment condition indicating attachment of all blades of the rotor, and modifying the torque restriction, based on the blade attachment condition, to prevent application of the torque to the rotor by the rotor-drive system in both the direction of the rotor torque and in the direction of the counter-torque.

The wind turbine may comprise a control system and the sensors of each blade may be arranged to communicate with the control system independently of the sensors of any other blades.

The sensors may comprise blade load sensors. The blade load sensors may comprise one or both of a flap-wise load sensor and an edge-wise load sensor on each blade. The direction of the rotor torque may be based on the direction of the load measured by the blade load sensors.

Engaging the rotor-lock system may comprise inserting lug pins into a locking element of the rotor in order to fix the rotor about the horizontal axis.

The method may further comprise applying a rotor brake to the rotor, the rotor brake being arranged to apply a frictional torque to the rotor about the horizontal axis, the rotor brake being applied during step c).

According to a second aspect of the invention, there is provided a method of constructing or dismantling a wind turbine rotor, the method comprising: engaging a rotor lock of a wind turbine to fix the rotor in a locked orientation about a horizontal axis; adding a wind turbine blade to or removing a wind turbine blade from the rotor such that a resultant weight of the one or more blades generates a rotor torque which is opposed by a rotor-lock counter-torque from the rotor-lock; and disengaging the rotor lock by carrying out the method of the first aspect.

According to a third aspect of the invention, there is provided a wind turbine comprising: a rotor having one or more wind turbine blades; a rotor-lock system engagable to lock the rotor in a fixed orientation about the rotational axis of the rotor; a sensor system configured to generate rotor data, the rotor data indicating a direction of the rotor torque; a rotor-drive system configured to apply a rotor-drive counter-torque to the rotor and a control system configured to cause the wind turbine to carry out the method of the first aspect.

The wind turbine may further comprise a load sensor arranged in the blade, the load sensor being coupled to the control system.

According to a fourth aspect of the invention, there is provided a computer program product comprising software code adapted to control a wind turbine when executed on a data processing system, the computer program product being adapted to perform the method of the first aspect.

BRIEF DESCRIPTION OF THE DRAWINGS

Embodiments of the invention will now be described with reference to the accompanying drawings, in which.

DETAILED DESCRIPTION OF EMBODIMENTS

Figure 1:
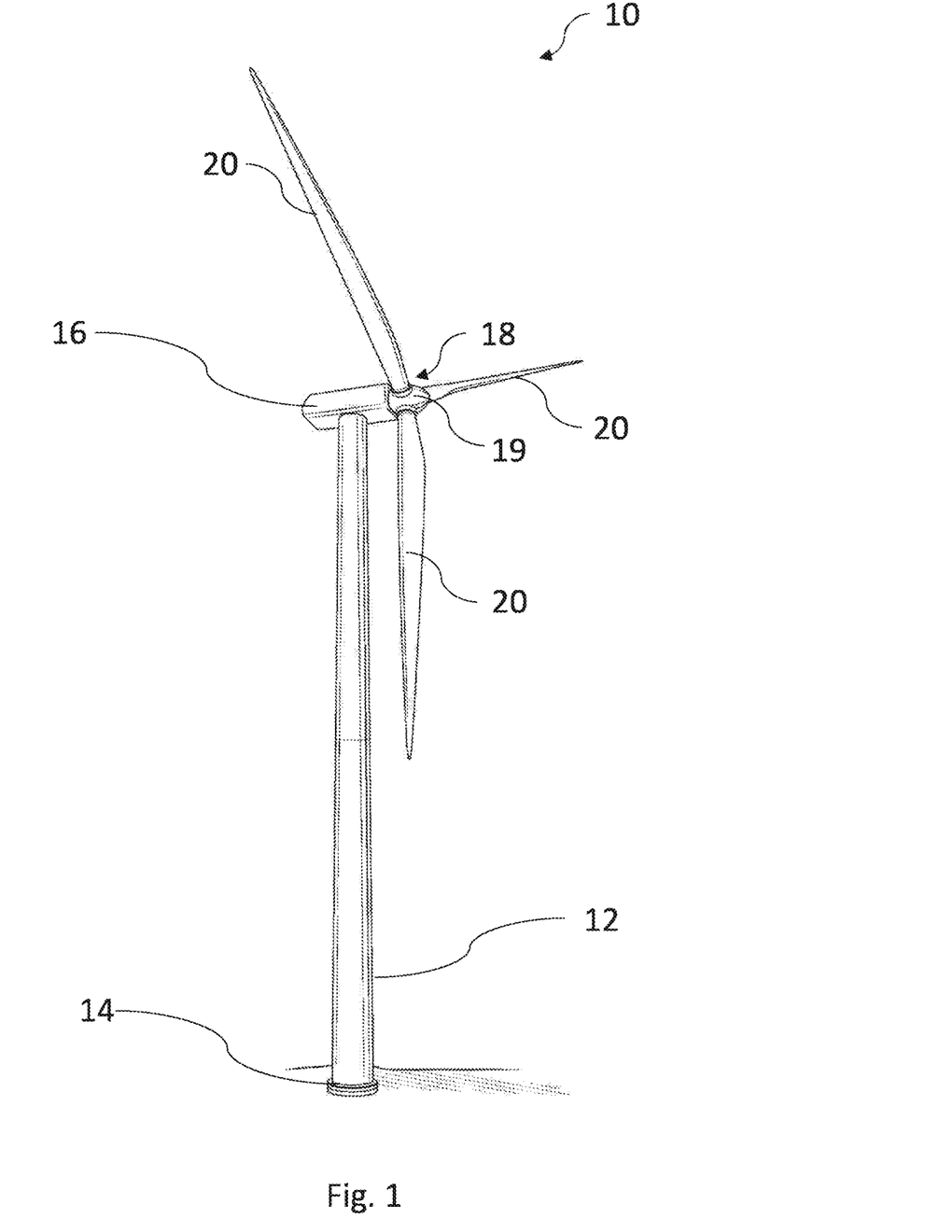
FIG. 1 shows a wind turbine according to the invention.

FIG. 1 shows a wind turbine 10 having a tower 12 extending upwardly from a foundation 14. The tower 12 supports a nacelle 16, the nacelle containing a generator and control systems for controlling the wind turbine 10. A rotor 18 is rotatably coupled to the nacelle 16 via a rotor shaft and arranged to provide a rotational torque to the generator inside the nacelle 16. The rotor 18 has a hub 19 and wind turbine blades 20 extending radially outwardly from the hub 19. It will be understood that, while the wind turbine 10 shown in FIG. 1 has three blades, wind turbines may have any number of blades.

Figure 2:
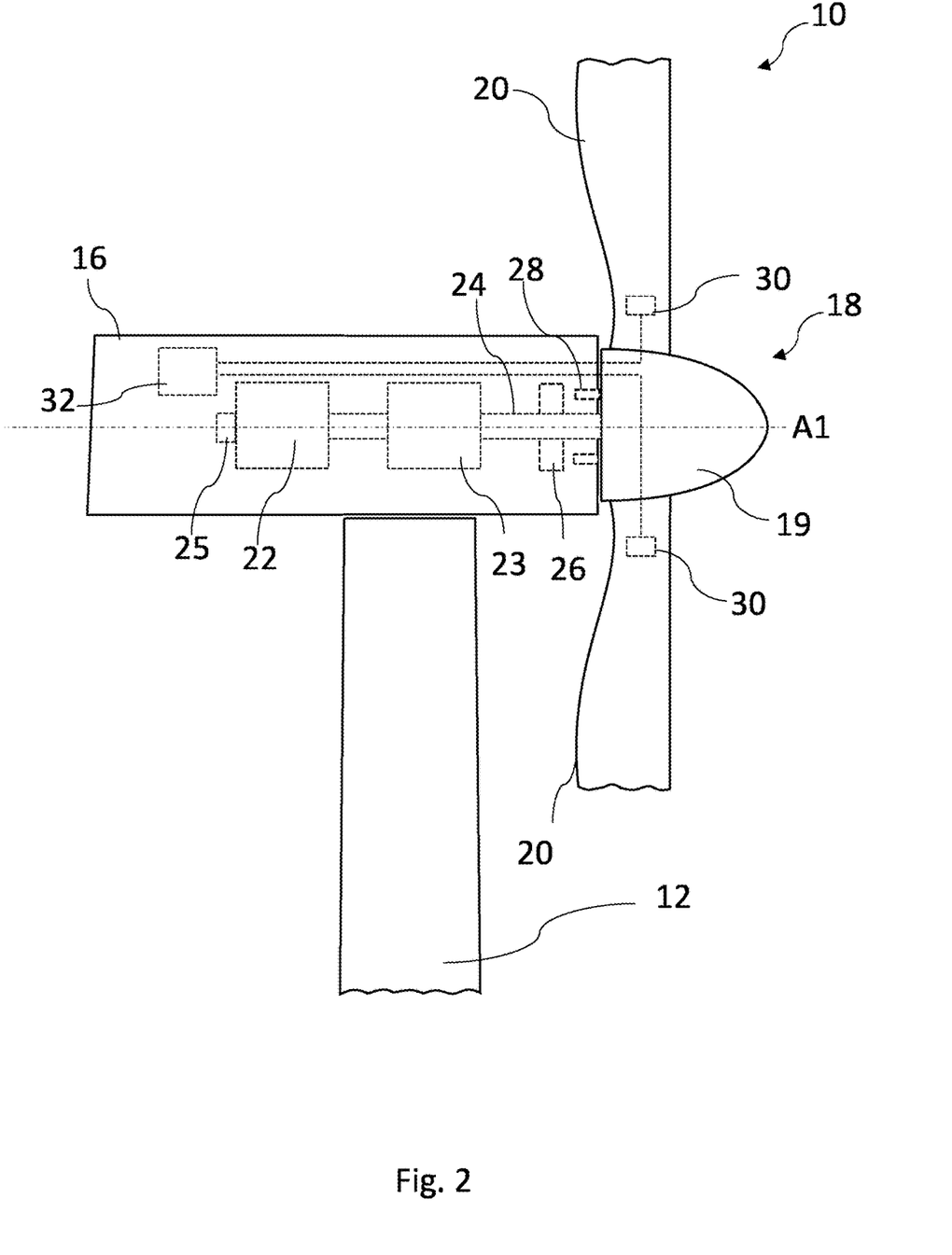
FIG. 2 shows a cross-section of a wind turbine according to the invention in an unlocked configuration.
Figure 3:
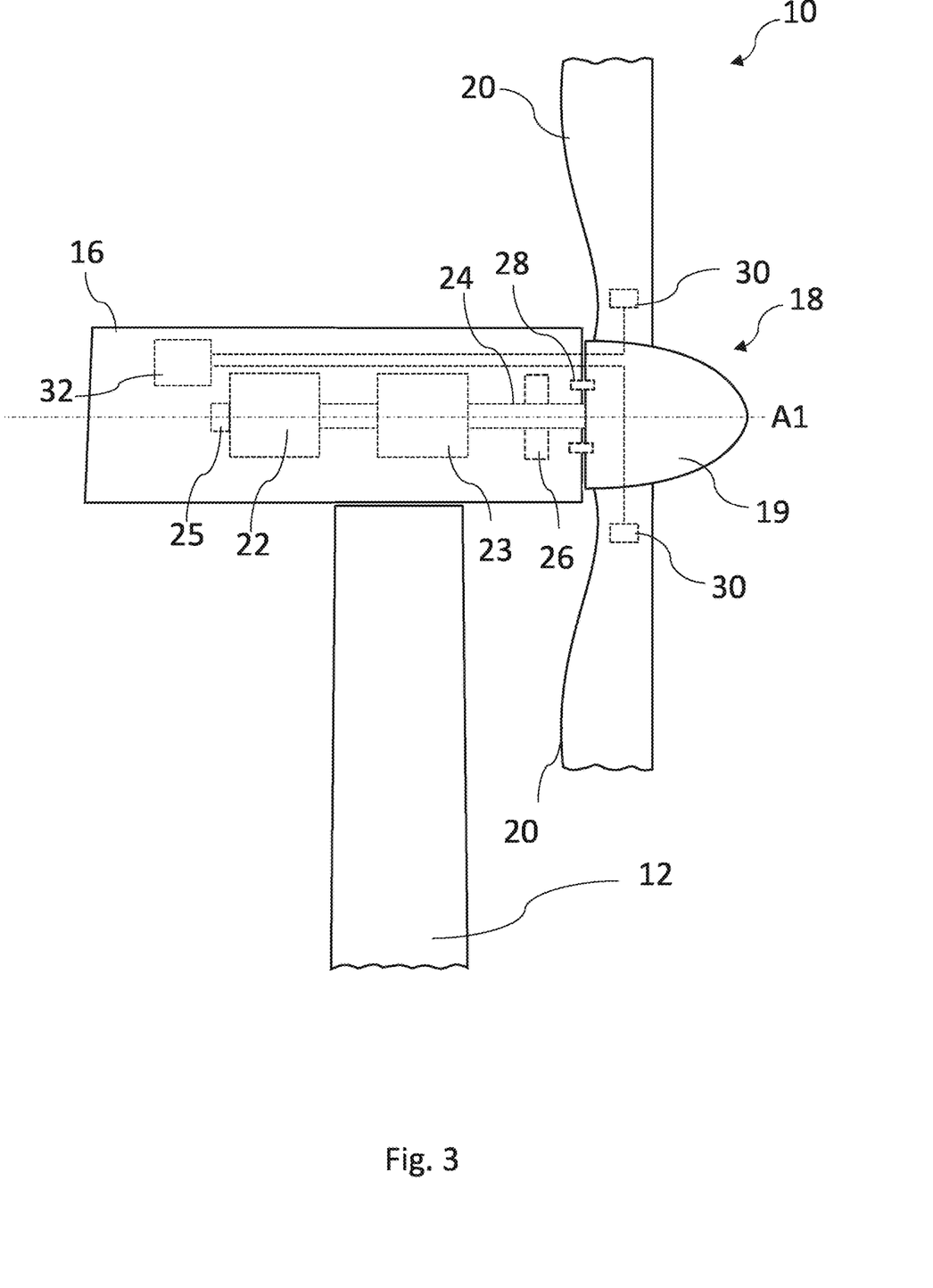
FIG. 3 shows a cross-section of a wind turbine according to the invention in a locked configuration.

FIGS. 2 and 3 schematically illustrate elements of the internal workings of a wind turbine 10 and in particular show the arrangement inside the nacelle 16. The wind turbine rotor 18 is coupled to a generator 22 via a gearbox 23 and via a rotor shaft 24. In general, the gearbox 23 may not be present for direct drive wind turbines. As the rotor 18 may be rotated by the wind, the rotor 18 may rotate the rotor shaft 24 and may thereby provide a torque to the generator 22, which may in turn generate electrical power. In some cases, such as where there is a need to rotate the rotor 18, a rotor-drive system may be used, typically in the form of a turner gear 25. However, in an alternative embodiment, the rotor-drive system may supply electrical power to the generator 22 and the generator 22 may act as a motor to rotate the rotor 18 by applying a torque to the rotor shaft 24.

The nacelle 16 also houses a rotor brake 26, which is arranged to provide a braking torque to the rotor 18, such as via the rotor shaft 24. The rotor brake 26 may assist to control the position of the rotor 18 during rotor construction, dismantling or maintenance.

The wind turbine 10 also has a rotor lock 28. The rotor lock 28 may selectively lock the rotor 18 in a fixed orientation about the rotor axis A1 by mechanical engagement with the rotor 18 or rotor shaft 24. Generally, the rotor 18 may be brought to rest by the rotor brake 26 and may be locked in position by the rotor lock 28. The rotor lock 28 may therefore provide a higher degree of safety for workers during construction, disassembly or maintenance of the rotor 18. The rotor lock 28 may comprise a number of pins that are insertable from the nacelle into the rotor hub 19 in order to fix the nacelle 16 and hub 19 relative to each other, or alternatively may be a lock applied to the rotor shaft 24, such as a pin inserted radially into the rotor shaft 24 to fix the rotor shaft 24 relative to the nacelle 16.

The rotor-drive system of the wind turbine 10 may be in the form of a turner gear 25. The turner gear 25 may be used to apply a torque to the rotor 18, optionally via the driveshaft 24 and/or the gearbox 23, in order to rotate the rotor 18 into a desired orientation. The turner gear 25 may be permanently installed within the nacelle 16 or may be installed temporarily and removed depending on whether the turner gear 25 is needed. The turner gear 25 may be needed only during construction, disassembly and/or maintenance of the nacelle 16 and so may be installed temporarily during these procedures. Generally, the turner gear 25 may comprise a motor and a gear arranged to engage with the rotor shaft 24 in order to drive the rotor 18.

FIG. 3 shows the rotor lock 28 moved into a locked position to prevent rotation of the rotor 18 about the rotor axis A1, while FIG. 2 shows the rotor lock 28 in an unlocked position where the pins of the rotor lock 28 are withdrawn from the rotor 18.

Each rotor blade 20 has a load sensor 30. The load sensors 30 are communicatively coupled to a control system 32. It can be seen that each sensor 30 may be directly coupled to the control system 32, as opposed to the sensors being daisy chained and having a single communication path to the control system 32, which all sensors would use. The load sensors 30 may also be coupled to the control system 32 only when the respective blades 20 are coupled to the hub 19. Since the sensors 30 may be coupled individually to the control system 32, the control system 32 may identify when each blade is connected by its ability to communicate with the sensors of that blade. While this is described above in connection with load sensors, it will be understood that any sensor arranged within a blade may communicate with a control system in order to provide an indication of blade attachment.

During wind turbine rotor construction and deconstruction, the rotor may be locked in a series of positions by the rotor lock in order to allow wind turbine blades to be safely coupled to and decoupled from the rotor hub. However, during the time period when a rotor may be locked in position, the rotor may move a small distance and the rotor lock may thereby frictionally engage with the rotor or rotor shaft such that the actuators intended to unlock the rotor lock are unable to move the rotor lock and unlock the rotor. For example, the rotor may move and lugs of the rotor may interfere with pins of the rotor lock. In order to free the rotor from being bound with the rotor lock, an operator may drive the rotor, using a rotor-drive system, so as to loosen the rotor lock and allow unlocking of the rotor.

However, there is an issue that the user may apply a torque to the rotor in the opposite direction from that which is intended, thereby increasing the binding force on the rotor lock, as opposed to decreasing it. Due to the magnitude of the forces involved, this may result in damage to the wind turbine, such as cracking of the bearings of the wind turbine. In particular, where the rotor may be partially constructed, the rotor blades may apply a torque to the rotor due to their weight. Therefore, it is desirable that the torque applied by the user counteracts and does not supplement the torque due to the blade weight.

In order to address this issue, the present inventors have recognised that a control system may determine which blades are attached to a wind turbine, whether the wind turbine rotor is locked in position, and the orientation of the wind turbine rotor and the control system may apply a restriction to the torque generating means, whether it is a turner gear, generator or other torque generating means, such that a user may not apply a torque to the wind turbine rotor in a direction that is likely to damage the wind turbine. This direction is a direction of torque due to the wind turbine blade weight.

In this regard, FIGS. 4a-4d show wind turbine rotors at various stages of assembly. It will generally be understood that wind turbine blades are usually, though not exclusively, coupled to wind turbine rotors in a horizontal orientation for convenience. Therefore, it is generally desirable to lock the wind turbine rotor with a wind turbine blade receiving portion of the hub facing horizontally.

Figure 4A:
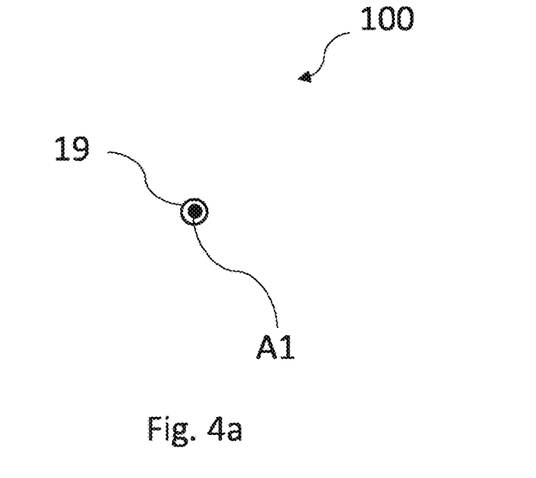
FIGS. 4a to 4d show different wind turbine rotor configurations during various stages of assembly and disassembly of the rotor.

FIG. 4a shows a partially assembled wind turbine rotor 100 having only a rotor hub 19 and no blades attached to the hub. In this arrangement, the rotor 100 may be considered as balanced, since there is no torque applied to the rotor 100 about the axis A1 due to the gravitational weight of any blades. Therefore, in this arrangement, the control system may prevent any counter torque being applied to the rotor, since there is no rotor torque due to weight of the rotor 100. Therefore, while the rotor is locked in the configuration shown in FIG. 4a, a torque restriction preventing torque from being applied in either direction (i.e. clockwise or anti-clockwise) about the axis A1 may be applied.

Figure 4B:
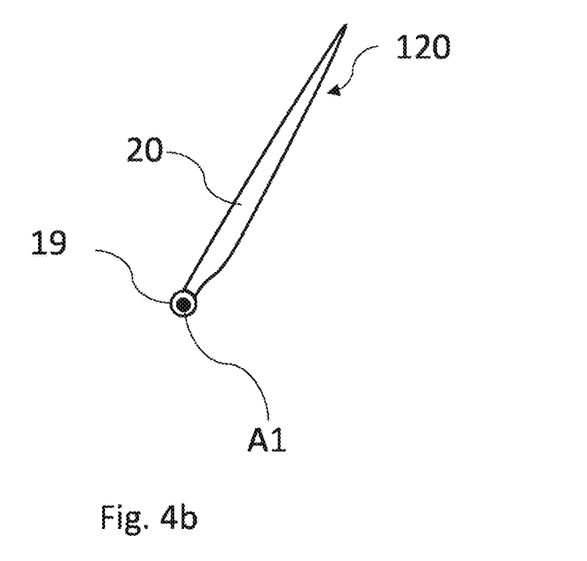

Looking to FIG. 4b, a partially assembled wind turbine rotor 120 has a single blade 20 coupled to the hub 19. The rotor 120 may be locked in position so as to receive a horizontally oriented wind turbine blade from the left and so the fixed wind turbine blade 20 is arranged at 30 degrees to the vertical, 60 degrees to horizontal. As a result, the weight of the blade 20 exerts a torque on the rotor 120 about the axis A1. This torque about the axis A1 may be resisted by a rotor lock in order to maintain the wind turbine rotor 120 in position. However, the torque due to the weight of the blade 20 may bind the rotor lock to prevent unlocking of the rotor lock. Therefore, a torque, which may be referred to as a rotor counter torque, may be needed in order to prevent the binding of the rotor lock and enable unlocking of the rotor 120. In order to ensure that the rotor counter torque is applied in the correct direction, which is in this case anti-clockwise, a torque restriction may be applied to the wind turbine that prevents the application of torque to the rotor in a clockwise direction, since the torque applied to the rotor due to the weight of the blade 20 is also in the clockwise direction.

Figures 4C, 4D:
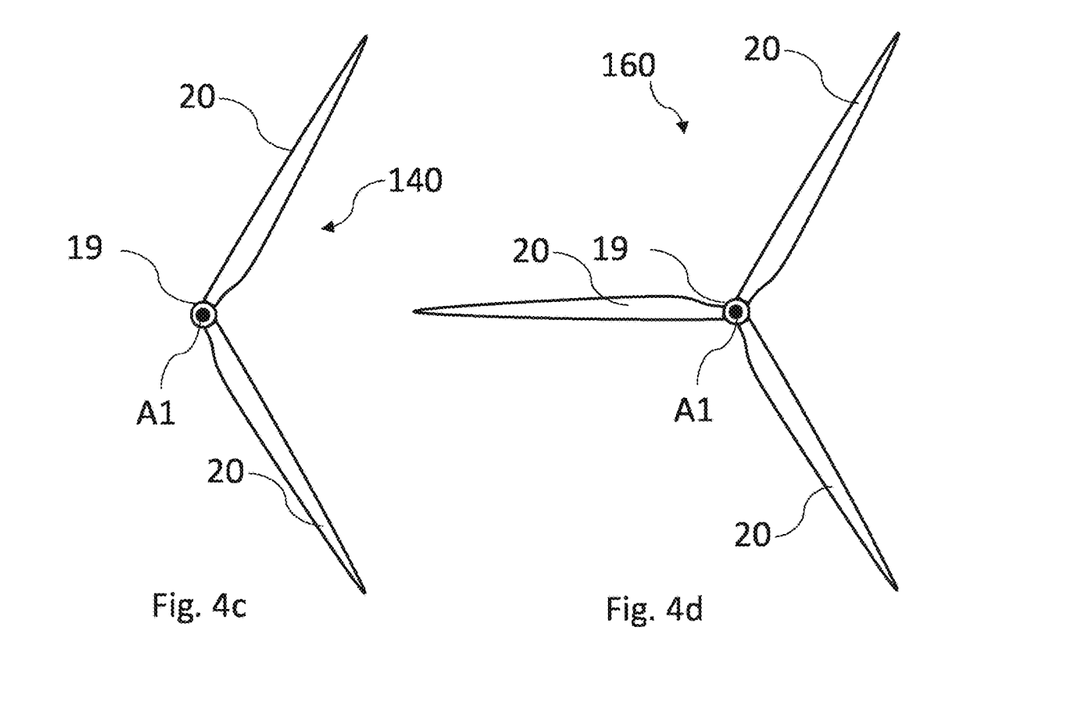

Similarly, FIG. 4c shows an unbalanced rotor 140 having two rotor blades 20 coupled to a hub 19, such that the rotor blades exert a torque about the rotor axis A1. Due to the blades being on the same side of the axis A1, the weight of the blades provides a clockwise torque to the rotor about the axis A1, which may bind a rotor lock. The binding of the rotor lock may be reduced by a rotor counter torque opposing the rotor torque due to the blade weight. In order to prevent the rotor counter torque being applied in the same direction as the rotor torque due to the weight of the blades, a torque restriction may be applied to the wind turbine, preventing torque being applied by the generator or turner gear in a clockwise direction.

Lastly, looking to FIG. 4d, there is shown a balanced wind turbine rotor 160 having three evenly distributed blades 20. In this case, the weight of the blades 20 should not provide a net torque about the rotor axis A1 and so should not cause binding of a rotor lock. Therefore, a torque restriction may be placed on the wind turbine preventing any rotor counter torque being applied to the wind turbine rotor 160 while it is locked in position.

Further, the application of a torque restriction may be dependent upon whether or not a blade is locked in position, as a blade may be rotated in either direction when it is not locked. Therefore, the torque restriction may be removed after a blade lock is unlocked. Removal of the torque restriction in this case may be desirable as the rotor may need to be rotated clockwise or anticlockwise, depending on the desired next orientation of the rotor.

Figure 5:
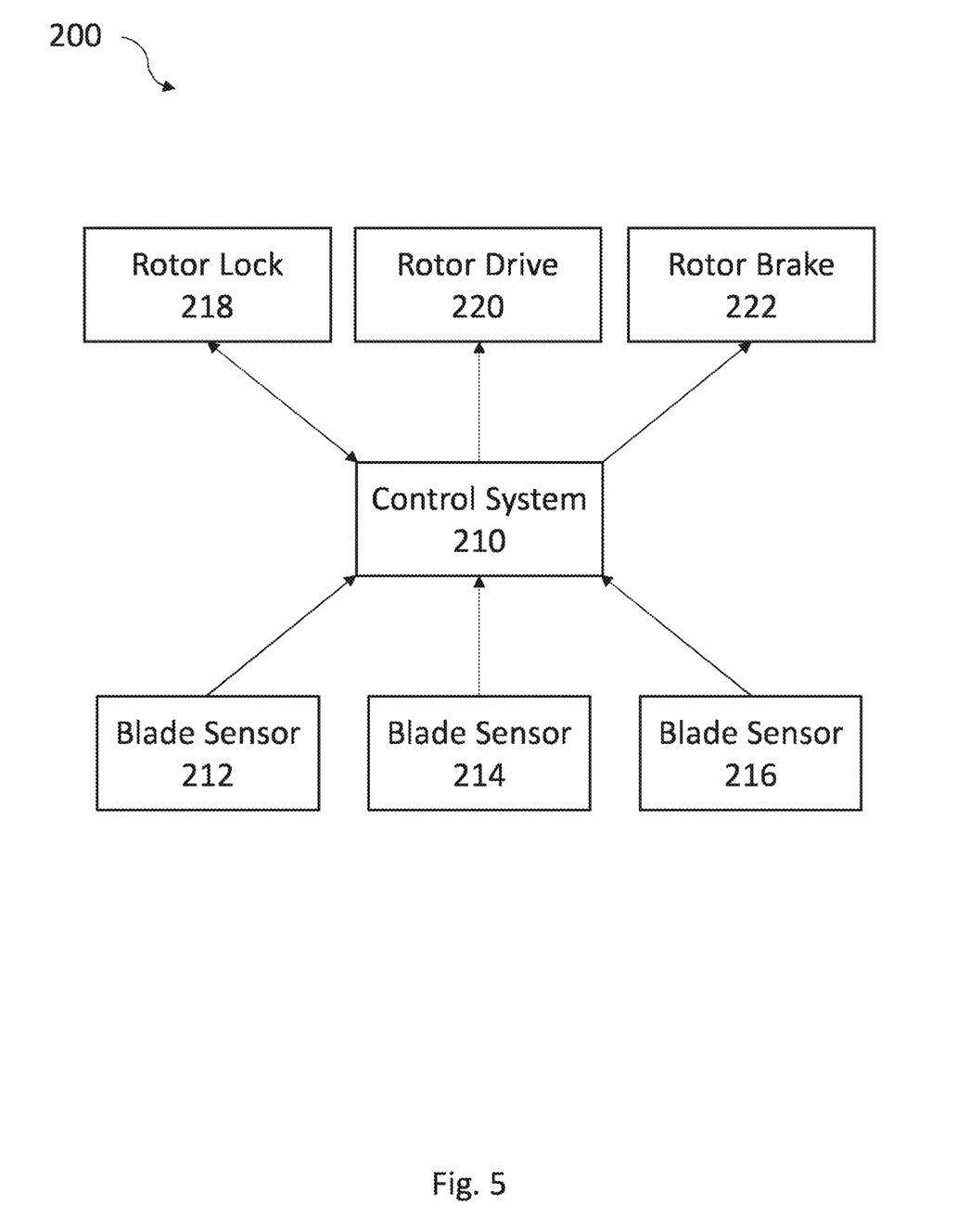
FIG. 5 is a block system diagram of a wind turbine according to the invention.

FIG. 5 shows a system diagram 200 of a wind turbine. The wind turbine has a control system 210, which may contain a processor and a memory storing instructions for controlling the wind turbine. The wind turbine may have three separate blade sensors 212, 214, 216 and the blade sensors may each be directly and independently coupled to the control system 210 such that each can communicate with the control system 210 irrespective of the connection of the other blade sensors. The blade sensors may be load sensors, and in particular, each blade may have a pitch-wise load sensor and an edge-wise load sensor, whose signals may be combined in order to provide an overall loading on the blade. As each blade is coupled to or decoupled from the wind turbine, the respective sensor 212 may be coupled to or decoupled from the control system 210. In this way, the control system may know the configuration of the wind turbine rotor. Since load sensors are commonly installed on wind turbine blades as standard, the use of the load sensors for determining the torque restriction may provide a straightforward and low cost system.

The control system 210 may also receive signals from and give signals to a rotor lock 218. In some cases, the control system 210 may automatically actuate or de-actuate the rotor lock 218 in order to lock the rotor in place or to allow movement of the rotor. Further, the control system 210 may apply a torque restriction and may restrict the direction in which torque may be applied by a rotor drive 220, such as a turner gear or motor generator, based on a signal from the rotor lock 218 indicating whether or not the rotor is locked. Further, the control system 210 may control a rotor brake 222, such as to engage the rotor brake 222 while the rotor lock 218 is de-actuated, such that the act of unlocking the rotor does not result in a sudden movement of the rotor.

While the control system may apply a torque restriction such that an input of a user is restricted, the control system may alternatively apply the counter-torque automatically. For example, where the control system receives a command to unlock the rotor, the control system may actuate a rotor drive in order to apply a rotor counter torque in the identified correct direction and may also de-actuate the rotor lock. Allowing a user to control the input may mean that a counter-torque is only applied when necessary and so may improve reliability of the system. However, an automated application of counter-torque may be more user-friendly and may allow faster operation of the wind turbine.

Figure 6:
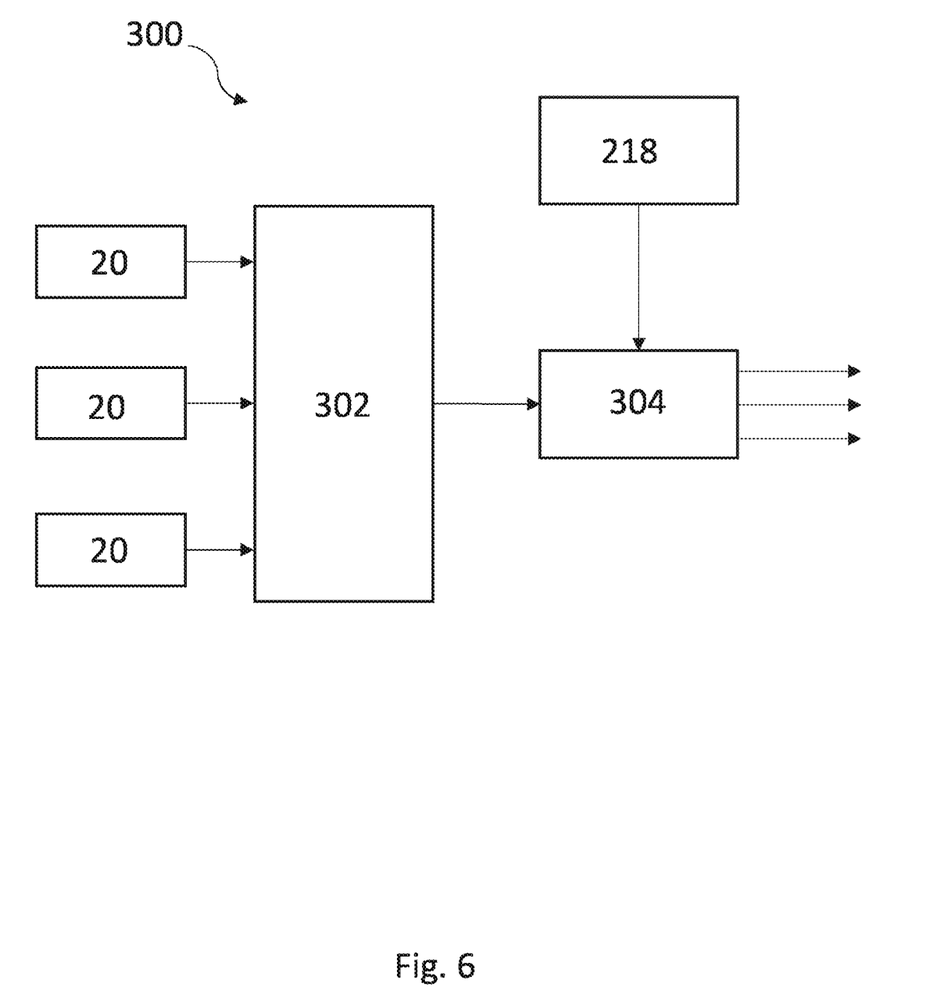
FIG. 6 is a further block system diagram of a wind turbine according to the invention.

FIG. 6 shows a further control system diagram 300 of a wind turbine, which shows that each blade 20, and the sensors and communication buses on each blade, may communicate separately with an unbalanced rotor torque direction monitor 302, which may determine a configuration of the rotor and use a lookup table to determine a desired torque direction and/or an impermissible torque direction. The unbalanced rotor torque direction monitor 302 may then output a desired torque direction and/or a torque restriction to a turner gear control logic unit 304, or more generally to a rotor drive control logic unit. Based on the torque restriction and/or desired torque direction and an input from a rotor lock system 218, the turner gear control logic unit 304 may output a torque restriction or may actuate a rotor drive according to the conditions described above.

The control system may additionally or alternatively provide a visual indication to a user of a desired torque direction or of a torque restriction. This may be less restrictive than a purely system-based torque restriction, allowing a greater level of freedom for the user while reducing the risk of accidental damage to the wind turbine.

Although the invention has been described above with reference to one or more preferred embodiments, it will be appreciated that various changes or modifications may be made without departing from the scope of the invention as defined in the appended claims.

The invention claimed is:

1. A method of operating a rotor-lock of a wind turbine, the wind turbine including a rotor having one or more blades, which due to gravitational pull, generates a rotor torque which is opposed by a rotor-lock counter-torque from the rotor-lock, the method comprising:
disengaging the rotor-lock, comprising:
  a) determining a direction of the rotor torque with a sensor system, wherein the sensor system comprises one or more sensors arranged in each of the one or more blades;
  b) applying a rotor-drive counter-torque to the rotor with a rotor-drive system, wherein the rotor-drive counter-torque acts to oppose the rotor torque and causes the rotor-lock counter-torque to reduce;
  c) during or after the application of the rotor-drive counter-torque, disengaging the rotor-lock;
wherein the step of determining the direction of the rotor torque comprises applying a torque restriction to the rotor-drive system based on the determined direction of the rotor torque, the torque restriction preventing the application of the rotor-drive counter-torque to the rotor by the rotor-drive system in the same direction as the rotor torque.

2. The method of claim 1, further comprising detecting that the rotor-lock has disengaged and terminating the torque restriction after disengaging the rotor-lock.

3. The method of claim 2, wherein each of the one or more sensors comprises a blade load sensor.

4. The method of claim 3, wherein the blade load sensor comprises a flap-wise load sensor or an edge-wise load sensor.

5. The method of claim 3, wherein the direction of the rotor torque is based on the direction of a load measured by the one or more blade load sensors.

6. The method of claim 1, wherein step b) is performed based on a manual input, the input being restricted based on the torque restriction.

7. The method of claim 1, further comprising displaying the torque restriction visually.

8. The method of claim 1, wherein step b) is performed automatically following the performance of step a).

9. The method of claim 1, wherein the wind turbine comprises a control system, and wherein the method further comprises attempting to establish communication between the control system and the one or more sensors, and determining a blade attachment condition based on communication with the one or more sensors, the torque restriction being based on the blade attachment condition.

10. The method of claim 9, further comprising:
determining that each of the one or more blades of the rotor has been attached, and
modifying the torque restriction, based on the blade attachment condition, to prevent application of the rotor-drive counter-torque to the rotor by the rotor-drive system in both the direction of the rotor torque and in a direction of the rotor-lock counter-torque.

11. The method of claim 1, wherein the one or more blades includes a plurality of blades, and wherein the wind turbine comprises a control system and the one or more sensors of each of the plurality of blades are arranged to communicate with the control system independently of the one or more sensors of any other of the plurality of blades.

12. The method of claim 1, further comprising engaging the rotor-lock, wherein engaging the rotor-lock comprises inserting lug pins into the rotor in order to fix the rotor about a horizontal axis.

13. The method of claim 1, further comprising applying a rotor brake to the rotor, the rotor brake being arranged to apply a frictional torque to the rotor about a horizontal axis, the rotor brake being applied during step c).

14. A method of constructing or dismantling a wind turbine rotor of a wind turbine, the method comprising:
engaging a rotor-lock of the wind turbine to fix the rotor in a locked orientation about a horizontal axis;
adding a wind turbine blade to or removing a wind turbine blade from the rotor such that, due to gravitational pull, the rotor is subjected to a rotor torque which is opposed by a rotor-lock counter-torque from the rotor-lock; and
disengaging the rotor-lock, wherein disengaging the rotor-lock comprises:
  a) determining a direction of the rotor torque with a sensor system, wherein the sensor system comprises one or more sensors arranged in the wind turbine blade,
  b) applying a rotor-drive counter-torque to the rotor with a rotor-drive system, wherein the rotor-drive counter-torque acts to oppose the rotor torque and causes the rotor-lock counter-torque to reduce;
  c) during or after the application of the rotor-drive counter-torque, disengaging the rotor-lock;
wherein the step of determining the direction of the rotor torque comprises applying a torque restriction to the rotor-drive system based on the determined direction of the rotor torque, the torque restriction preventing the application of the rotor-drive counter-torque to the rotor by the rotor-drive system in the same direction as the rotor torque.

15. A wind turbine comprising:
a rotor having one or more wind turbine blades;
a rotor-lock engageable to lock the rotor in a fixed orientation about a rotational axis of the rotor, wherein, due to gravitational pull, the rotor is subjected to a rotor torque which is opposed by a rotor-lock counter-torque from the rotor-lock;
a sensor system including one or more sensors arranged in each of the one or more wind turbine blades configured to generate rotor data, the rotor data indicating a direction of the rotor torque;
a rotor-drive system configured to apply a rotor-drive counter-torque to the rotor and
a control system configured to cause disengagement of the rotor lock by:
  a) determining the direction of the rotor torque with the sensor system,
  b) applying the rotor-drive counter-torque to the rotor with the rotor-drive system, wherein the rotor-drive counter-torque acts to oppose the rotor torque and causes the rotor-lock counter-torque to reduce;
  c) during or after the application of the rotor-drive counter-torque, disengaging the rotor-lock;
wherein the step of determining the direction of the rotor torque comprises applying a torque restriction to the rotor-drive system based on the determined direction of the rotor torque, the torque restriction preventing the application of the rotor-drive counter-torque to the rotor by the rotor-drive system in the same direction as the rotor torque.

* * * * *